(12) United States Patent
Lammas et al.

(10) Patent No.: US 6,375,421 B1
(45) Date of Patent: Apr. 23, 2002

(54) PIGGYBACK ROTOR BLISK

(75) Inventors: Andrew J. Lammas, Maineville; Philip W. Dietz, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 09/710,656

(22) Filed: Nov. 9, 2000

Related U.S. Application Data

(60) Provisional application No. 60/179,212, filed on Jan. 31, 2000.

(51) Int. Cl.$^7$ .................................................. F01D 1/02
(52) U.S. Cl. ................. 415/199.5; 416/198 A; 416/244 A
(58) Field of Search ................. 415/199.5; 416/244 R, 416/244 A, 198 R, 198 A

(56) References Cited

U.S. PATENT DOCUMENTS

| | | |
|---|---|---|
| 3,249,293 A | 5/1966 | Koff |
| 3,706,509 A | 12/1972 | Britt |
| 3,742,706 A | 7/1973 | Klompas |
| 4,016,636 A | 4/1977 | Schneider et al. |
| 4,827,712 A | 5/1989 | Coplin |
| 4,844,694 A | 7/1989 | Naudet |
| 5,537,814 A * | 7/1996 | Nastuk et al. ............. 60/39.31 |
| 5,628,621 A * | 5/1997 | Toborg ................... 416/198 A |

* cited by examiner

*Primary Examiner*—Edward K. Look
*Assistant Examiner*—Ninh Nguyen
(74) *Attorney, Agent, or Firm*—Nathan D. Herkamp; Francis L. Conte

(57) ABSTRACT

A compressor rotor includes coaxially adjoining disks having corresponding rows of rotor blades. A forward shaft is affixed to a forward disk and includes an annular seat for being mounted in a bearing to support the rotor at its forward end. A blisk coaxially surrounds the shaft axially between the seat and forward disk, and is removably fixedly joined piggyback to the shaft. In a repair method, the blisk may be removed from the compressor rotor without requiring teardown of the compressor rotor itself.

21 Claims, 7 Drawing Sheets

PIGGYBACK ROTOR BLISK

This applications claims the benefit of U.S. Provisional Application No. 60/179,212, filed Jan. 31, 2000.

BACKGROUND OF THE INVENTION

The present invention relates generally to gas turbine engines, and, more specifically, to compressors therein.

A turbofan gas turbine engine includes in serial flow communication a fan, multistage axial compressor, combustor, high pressure turbine (HPT), and low pressure turbine (LPT). Air is pressurized in the compressor and mixed with fuel and ignited in the combustor for generating hot combustion gases which flow downstream through the HPT and LPT which extract energy therefrom. The HPT powers the compressor through a rotor shaft therebetween and the LPT powers the fan through another rotor shaft therebetween.

In a multistage axial compressor many rows or stages of compressor rotor blades are used for increasing air pressure as the air flows downstream through the compressor from stage to stage. The compressor blades are mounted to the perimeter of corresponding rotor disks which are suitably axially joined together to form a common rotor assembly mounted at opposite ends in suitable bearings.

A typical rotor disk includes axial dovetail slots in the perimeter thereof in which axial dovetails of the corresponding compressor blades are retained. Or, the disk perimeter may include a circumferential dovetail slot for receiving circumferential-entry blade dovetails. In both cases, centrifugal loads generated by the blades during rotary operation are carried through the disk radially inwardly into a thinner web and in turn into a thicker hub having substantial hoop strength for accommodating the blade loads.

The disks are separately manufactured from the individual blades, all with precise manufacturing tolerances for maximizing the uniformity of the blades and disks circumferentially around an axial centerline axis. Since the compressor rotor operates at high rotational speed, it must be manufactured with minimal radial eccentricity from the centerline axis and with minimal mass unbalance therearound. In this way, minimal unbalance and vibration therefrom may be obtained for obtaining smooth performance of the engine.

However, bladed disks require that the supporting disks have sufficient size and corresponding mass to withstand the centrifugal loads and corresponding stresses. The disks, therefore, typically have enlarged hubs with minimal diameter bores suspended from the disk perimeter by thin webs.

Compressor rotor design may be enhanced by replacing one or more of the bladed disks with unitary or one-piece blisks in which the blades or airfoils are integrally formed with the perimeter of the supporting disk without dovetails. The improved mechanical strength of the unitary airfoils and supporting disk in the blisk permit a substantial reduction in size of the disk and associated weight. Weight reduction is a significant design objective in producing light weight turbofan engines for powering aircraft in flight.

Blisks, however, introduce a corresponding problem in repair thereof which may be required after extended usage in service. Foreign object damage of compressor airfoils requires either repair thereof or replacement as warranted by the degree of damage. For a bladed disk configuration the individual blades may be readily removed from their corresponding dovetail slots in the disks, and remotely repaired or simply substituted by a replacement blade.

Since blisk airfoils are integrally formed with the supporting disk the airfoils are not individually removable from the blisk, which therefore requires that the entire blisk be removed from the compressor for repair or replacement thereof. Blisk removal requires compressor teardown which is both time consuming and expensive during a maintenance repair overhaul.

A typical compressor rotor for a multistage axial compressor includes several rotor components having one or more rotor stages which are axially joined together at corresponding radial flanges. There are several radial flanges between the opposite ends of the collective rotor which have corresponding bearing seats which are supported in bearings during operation. The several rotor components must therefore be assembled for minimizing eccentricity relative to the engine axial centerline axis, and balanced as an assembly for reducing unbalance.

Each radial flange has a flat annular face including a plurality of circumferentially spaced apart axial holes through which mounting fasteners in the form of bolts are used and retained by corresponding nuts for joining together the adjoining rotor components. The opposite ends of each rotor component are subject to manufacturing variation in dimensions which typically result in small amounts of relative eccentricity and tilt or non-perpendicularity of the end planes. When the rotor components are assemble together, eccentricity and tilt of the individual components stack together. This requires suitable pre-inspection of the components and deliberate indexing or clocking thereof for minimizing the relative eccentricity at the supporting bearing planes of the rotor.

Furthermore, the assembled rotor then undergoes a balancing procedure for minimizing undesirable unbalance thereof. The so assembled and balanced rotor may then be installed in its corresponding compressor casing during assembly of the compressor and engine.

Although an individual blade may be removed from a bladed disk without requiring compressor rotor teardown, a blisk airfoil cannot. Instead, the entire blisk must be removed and requires engine and compressor teardown, and corresponding reassembly of the compressor rotor and balancing thereof in the elaborate process described above.

Small compressor blisks up to about 30 cm in outer diameter have been commercially used in this and other countries for many years. Such small blisks are used in relatively small engines. One or more blisks may be used in a compressor rotor and typically include curvic couplings on the opposite axial faces of the hub which mate with corresponding couplings on adjoining rotor components. Alternatively, the blisks may include integral annular mounting arms with corresponding radial flanges for being attached to adjacent rotor components.

In either embodiment, the blisks form an integral component of the collective compressor rotor and are part of its structural integrity, and necessarily carry torque loads in series between adjoining rotor components. The collective rotor also provides a continuous loadpath between the mounting bearings for carrying various rotor loads to the bearings. The blisks, therefore, are not removable without compressor rotor teardown.

In view of the substantial weight reduction attributable to blisks over bladed disks, substantially larger blisks up to about 90 cm, for example, are being developed for substantially larger turbofan gas turbine engines in the 70,000 pound thrust class, and higher. These large blisks are considerably expensive. The corresponding compressor and engine teardown required for repairing such a large blisk in a large compressor has a correspondingly large maintenance expense associated therewith.

Accordingly, it is desired to provide an improved compressor rotor having one or more blisks therein which may be repaired without requiring complete compressor rotor teardown during a maintenance overhaul.

BRIEF SUMMARY OF THE INVENTION

A compressor rotor includes coaxially adjoining disks having corresponding rows of rotor blades. A forward shaft is affixed to a forward disk and includes an annular seat for being mounted in a bearing to support the rotor at its forward end. A blisk coaxially surrounds the shaft axially between the seat and forward disk, and is removably fixedly joined piggyback to the shaft. In a repair method, the blisk may be removed from the compressor rotor without requiring teardown of the compressor rotor itself.

BRIEF DESCRIPTION OF THE DRAWINGS

The invention, in accordance with preferred and exemplary embodiments, together with further objects and advantages thereof is more particularly described in the following detailed description taken in conjunction with the accompanying drawings in which.

DETAILED DESCRIPTION OF THE INVENTION

Figure 1:
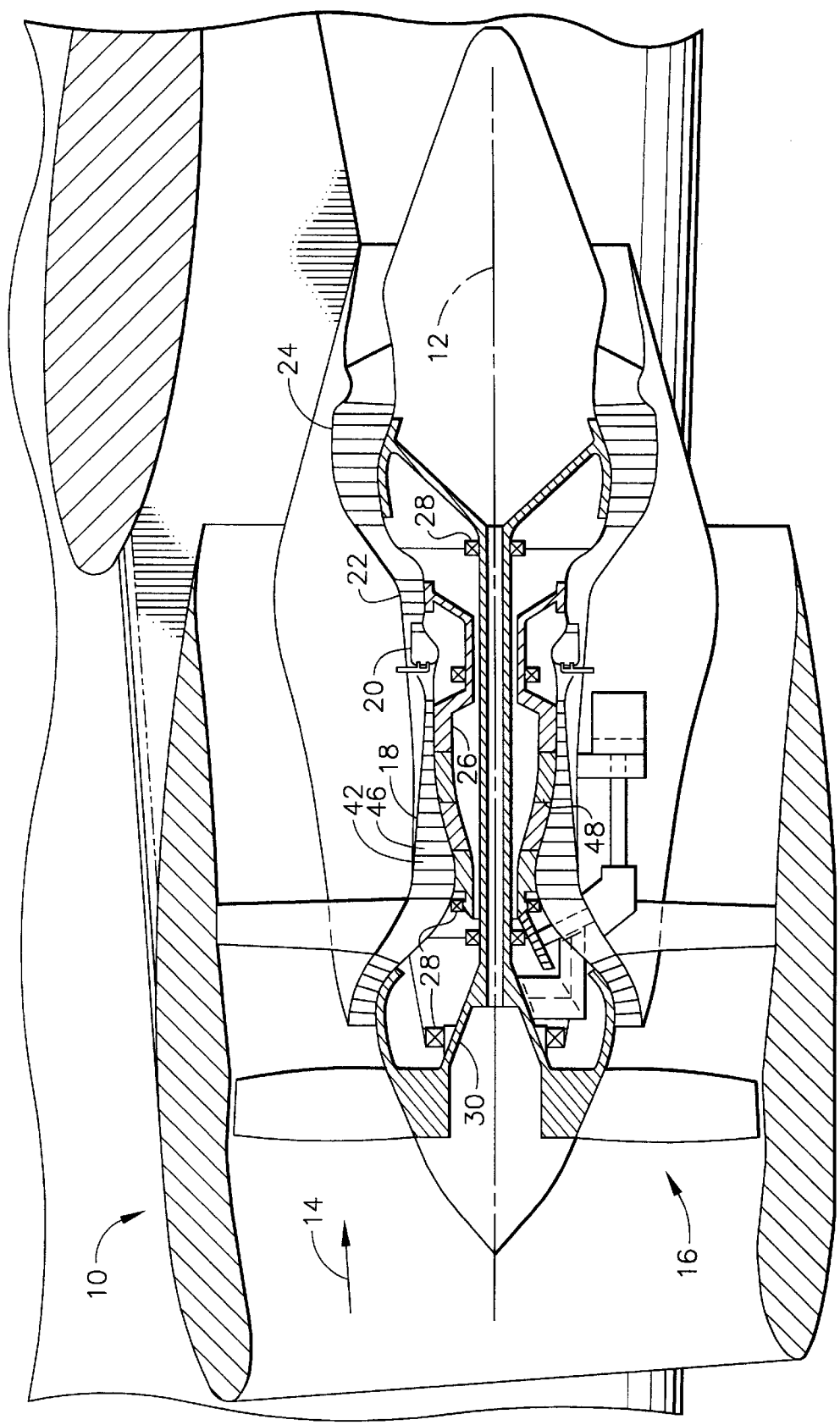
FIG. 1 is an axially sectional schematic view of an exemplary turbofan gas turbine engine for powering an aircraft in flight.

Illustrated in FIG. 1 is an exemplary turbofan gas turbine engine 10 mounted to a wing of an aircraft for providing propulsion thrust during operation. The engine is axisymmetrical about a longitudinal or axial centerline axis 12 and receives air 14 through a forward inlet which is pressurized by the engine for producing propulsion thrust.

The engine includes a fan module 16 at its front followed in turn by a multistage axial high pressure compressor (HPC) 18, annular combustor 20, high pressure turbine (HPT) 22, and low pressure turbine (LPT) 24. During operation, a portion of the fan air is compressed in the HPC 18 and mixed with fuel and ignited in the combustor for generating hot combustion gases which flow downstream in turn through the HPT and LPT for powering the HPC and fan, respectively, through corresponding rotor shafts.

The HPC 18 includes an annular compressor rotor 26 which is an assembly of rotor components disposed coaxially around the centerline axis 12. The rotor 26 is mounted at opposite ends in suitable bearings 28 for rotation during operation. The fan module includes a fan shaft or rotor 30 extending concentrically inside the compressor rotor 26 and joined at its aft end to the LPT 24. The fan shaft is also supported in corresponding bearings 28 along its length for rotation during operation independent from the compressor rotor.

Figure 2:
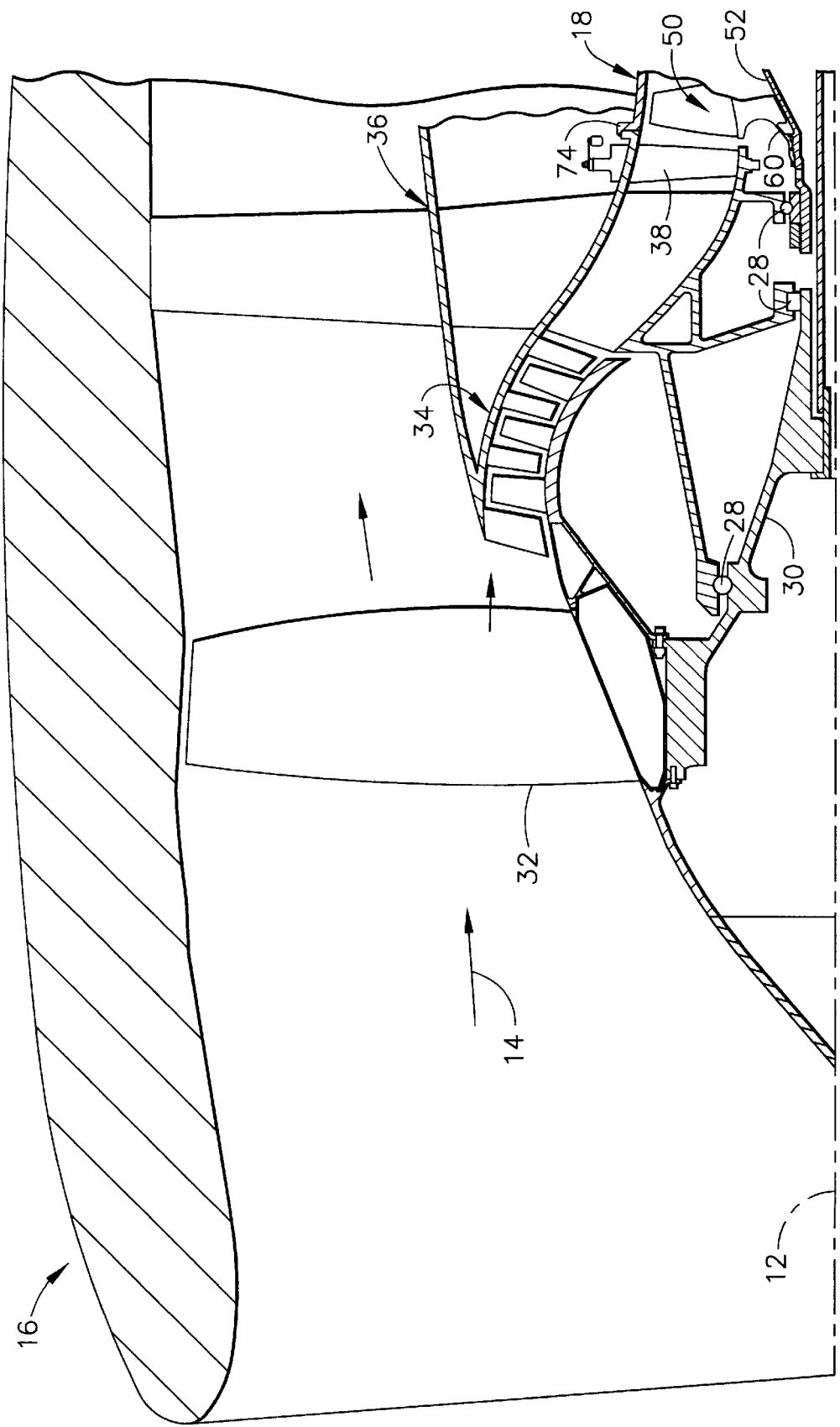
FIG. 2 is an enlarged axial sectional view of a portion of the fan module of the engine illustrated in FIG. 1 disposed axially upstream from a multistage axial compressor thereof.

As shown in more detail in FIG. 2, the fan module 16 includes a fan 32 having a row of large fan blades extending radially outwardly from a supporting disk, with the disk in turn being joined to the forward end of the fan shaft 30. A low pressure or booster compressor 34 includes several stages of compressor blades joined to the fan disk for rotation therewith.

An annular front frame 36 supports the several components of the fan module in a sub-assembly which is removable from the remainder of the engine for maintenance purposes. A row of variable inlet guide vanes 38 is disposed at the junction between the booster and high pressure compressors for channeling the airflow into the compressor 18. The front frame supports the stator vanes of the booster compressor 34, and also supports three exemplary bearings 28 which support the forward ends of the fan and compressor rotors.

Figure 3:
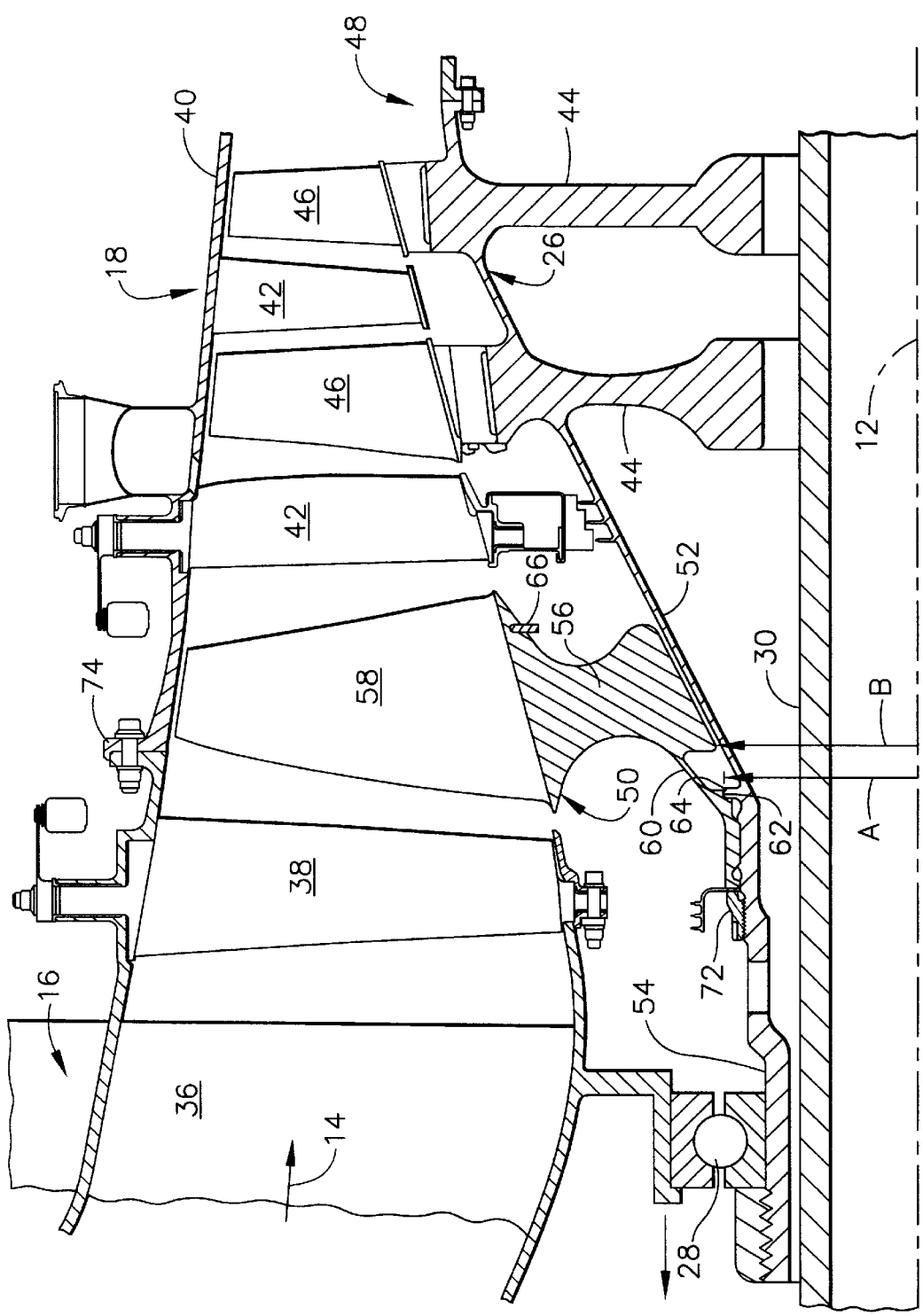
FIG. 3 is an enlarged axial view of the front portion of the high pressure compressor illustrated in FIG. 1 including a rotor and piggyback blisk joined thereto in accordance with an exemplary embodiment 6f the present invention.

The front portion of the HPC 18 is illustrated in more detail in FIG. 3. The compressor 18 includes an annular stator casing 40 from which extend radially inwardly several rows or stages of compressor stator vanes 42, which may be variable or fixed as desired. The HPC rotor 26 includes a plurality of coaxially adjoining rotor disks 44 each having a row of compressor rotor blades 46 extending radially outwardly therefrom. This is typically effected by having individually removable blades with corresponding dovetails mounted in complementary dovetail slots formed in the perimeter of the respective disks.

Alternatively, the blades may be integrally formed with the corresponding disks in a unitary or one-piece configuration known in the art as a blisk (not shown). As shown schematically in FIG. 1, and in more detail in FIG. 3, the compressor vanes 42 and blades 46 alternate in turn in the axially downstream or aft direction and decrease in size for increasing the pressure of the air 14 as it flows axially through the compressor to the combustor.

As shown in FIG. 1, the entire engine includes many components which require elaborate assembly with precise tolerances. The rotating components of the engine are mounted in the several bearings 28 for high speed rotary operation with minimal unbalance. The HPC 18 is located within the middle of the engine and is thusly inaccessible for maintenance without sufficient disassembly of the engine.

The compressor rotor 26 includes a plurality of flange joints 48 axially joining together the various disks thereof in a collective assembly of rotor components. This is illustrated in more detail in FIG. 3 wherein the first two rotor disks 44 are illustrated in an exemplary embodiment integrally formed with each other in a unitary two-stage tandem rotor component which in turn is connected by one flange joint 48 to the downstream rotor components. Each rotor component may include a single rotor disk or multiple rotor disks welded together in tandem as desired. These rotor components are suitably joined together by the various flange joints 48 to complete the entire compressor rotor.

The flange joints 48 are conventional and typically include a pair of annular radial flanges having a plurality of circumferentially spaced apart axial holes therethrough in which fastening bolts are disposed and secured by nuts to provide a connection for assembly or disassembly as required.

The mating faces of the individual flange joints 48 illustrated in FIG. 3, for example, are subject to dimensional variation due to typical manufacturing tolerances. Accordingly, the faces typically experience relative eccentricity between opposite ends of each of the rotor components. And the opposite flanges of each rotor component may also experience non-perpendicularity or tilt. This eccentricity and tilt of each rotor component is subject to stackup as the components are assembled and bolted together.

The assembly process for the compressor rotor is therefore relatively complex and requires individual inspection and measurement of the rotor components for determining relative eccentricity and tilt, and then deliberately indexing or clocking the rotary positions of the components for minimizing the relative eccentricity of the assembled rotor at its bearing planes. In this way, structural unbalance of the assembled rotor may be minimized for minimizing vibration during operation.

The assembled rotor is also balanced as an assembly prior to assembly in the stator casing for achieving smooth balanced operation of the rotor during operation.

In view of the complex assembly of many rotor components within the stator casing, it is undesirable to tear down the engine and compressor during a maintenance operation in view of the complexity and associated expense of reassembling the compressor and engine. Accordingly, typical compressor disks include perimeter dovetail slots for individually mounting discrete compressor blades which are individually removable during a maintenance operation for repair thereof. The compressor rotor thusly need not be disassembled for repairing such discrete blades.

However, as indicated above, compressor blisks in which the airfoils are integrally formed with the supporting disks in a unitary or one-piece assembly enjoy substantial performance and weight reduction advantages over conventional bladed disks. Small compressor blisks are found in commercial service and are integral parts of the compressor rotor which require engine and compressor teardown for removal of the blisks for repair or replacement. Teardown of a small turbine engine is considerably less involved than teardown of a large commercial aircraft engine. For this reason, large blisks are not presently known in use for large commercial turbofan engines in view of the prohibitive maintenance costs associated therewith.

In accordance with one embodiment of the present invention as illustrated in FIG. 3, the compressor rotor 26 includes a blisk 50 as its relatively large first stage mounted piggyback or in parallel with the compressor rotor 26. This permits independent assembly and disassembly of the blisk for maintaining structural integrity of the compressor rotor 26 without requiring teardown thereof during a maintenance operation for repairing the compressor and blisk.

In order to mount the blisk 50 to the compressor rotor 26 without affecting the integrity thereof, the rotor includes an annular forward shaft 52 affixed to a forward one of the disks 44 thereof, such as the second stage disk. In a preferred embodiment, the forward shaft is conical for strength and for reducing the inner diameter of the blisk 50. The forward shaft 52 is preferably integrally formed with the second stage disk 44 in a unitary configuration therewith, although in alternate embodiments it may be bolted thereto with a suitable flange joint.

The forward shaft 52 decreases in diameter in the axially forward direction and terminates at an annular or cylindrical journal or seat 54 at its forward end which is mounted in the third bearing 28 supported by the front frame 36. In this way, the bearing supports the compressor rotor 26 at its forward end with a structurally continuous loadpath between the forward seat 54 and the second stage disk 44, and without a series loadpath through the blisk, which rests piggyback on the shaft.

The entire compressor rotor 26 including its forward shaft 52 may thusly be initially assembled for minimizing eccentricity between its axial bearing planes, and balanced prior to assembly in the compressor. Accordingly, during a maintenance operation the compressor rotor 26 itself does not require teardown for removing and repairing individual blades 46 thereof, or, more importantly, for repairing or replacing the piggyback blisk 50.

The blisk 50 simply coaxially surrounds the forward shaft 52 axially between the seat 54 and the forward disk 44, and is removably fixedly joined piggyback to the forward shaft without interrupting its axial integrity.

The piggyback mounted blisk 50 effects an improved high pressure compressor 18 and permits repair or replacement of the blisk without requiring teardown of the compressor rotor 26. The rotor may simply be repaired by initially removing the blisk 50 itself from the forward shaft 52 in situ within the assembled compressor 18 without disassembling the compressor rotor 26, including its forward shaft 52 and several rotor disks 44. A replacement blisk may be simply installed on the forward shaft 52 in the reverse order of removing the original blisk. The replacement blisk may be the original blisk suitably repaired, or may be an alternate blisk newly manufactured or otherwise repaired from another engine, and individually balanced.

As initially shown in FIG. 3, the blisk 50 includes a tubular disk or hub 56 having a central bore closely surrounding the forward shaft 52 and complementary therewith, such as being conical for providing a small and uniform gap therebetween. A row of integral airfoils 58 extend radially outwardly from the perimeter of the hub in a unitary or one-piece configuration therewith.

The blisk also includes an annular supporting arm 60 extending integrally from the hub in a preferably unitary configuration therewith. The blisk arm preferably extends forwardly, and is preferably conical in part to match the conical configuration of the forward shaft 52 therebelow.

Figure 4:
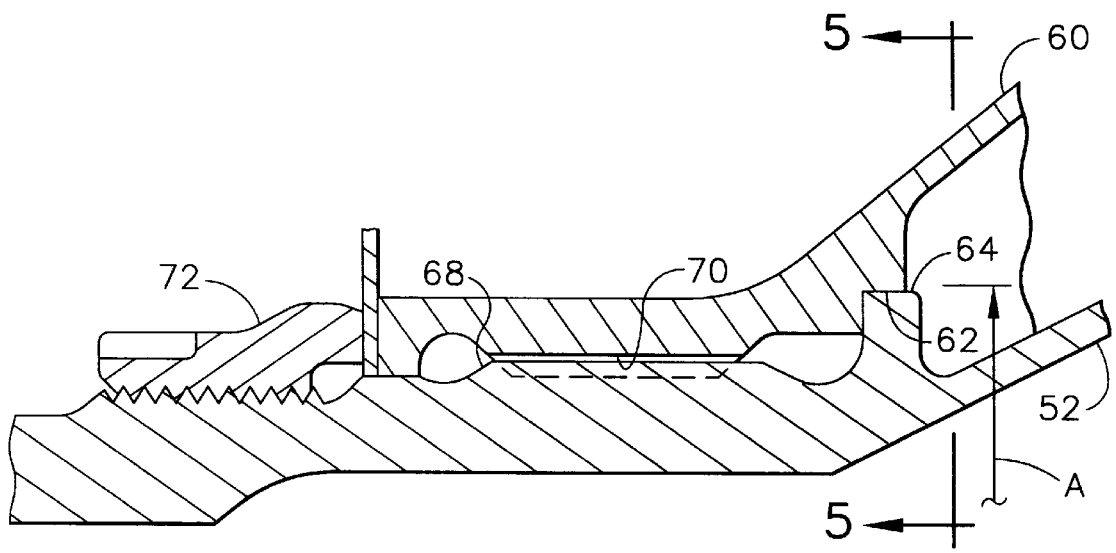
FIG. 4 is an enlarged axial sectional view of a supporting arm of the blisk illustrated in FIG. 3 joined to the forward shaft of the compressor rotor in accordance with an exemplary embodiment.
Figure 5:
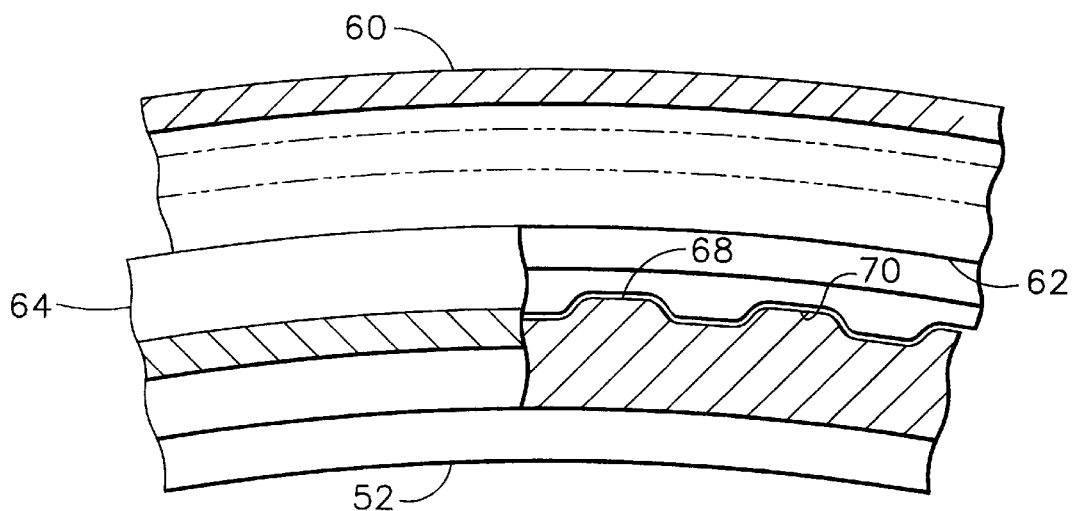
FIG. 5 is radial sectional view through a portion of the blisk arm and shaft illustrated in FIG. 4 and taken along line 5—5.

A preferred embodiment of piggyback mounting the blisk to the forward shaft is illustrated in more detail in FIGS. 4 and 5. The blisk arm 60 preferably includes an annular rabbet 62 in the form of a corner notch facing radially inwardly and aft from an intermediate inboard portion of the arm. Correspondingly, the forward shaft 52 includes an annular lug 64 which is complementary with the rabbet 62 for precisely coaxially aligning the blisk on the forward shaft with minimal eccentricity relative to the axial centerline axis of the engine.

As shown in FIGS. 3 and 4, the outer diameter of the lug 64 and the inner diameter of the rabbet 62 have a nominally common value A within suitable manufacturing tolerances to provide a precise interface between the blisk and forward shaft to ensure the concentricity thereof and minimize eccentricity and corresponding rotary unbalance.

The several flange joints 48 axially join together the several disks 44 in a collective assembly of rotor components with the forward shaft 52 at the forward end thereof. The axially adjoining components of the compressor rotor are stacked together during initial assembly to minimize eccentricity thereof from the centerline axis 12 of the rotor. The rabbet 62 and lug 64 are disposed coaxially with the centerline axis 12 to independently minimize eccentricity of the blisk 50 from the centerline axis.

In this way, concentricity and balance of the compressor rotor 26 and the blisk 50 are independently effected for permitting independent replacement of the blisk during maintenance without adversely affecting integrity or balance of the compressor rotor assembly 26. The blisk 50 is preferably independently balanced so that when it is assembled around the compressor forward shaft 52 the collective assembly of the rotor and blisk is suitably balanced.

The blisk 50 may be balanced in any conventional manner, and as illustrated in FIG. 3 for example, it may include a suitable balance correction 66 which is independent of the balance of the compressor rotor 26, including its disks 44 and forward shaft 52 collectively. The balance correction 66 is preferably in the form of a conventional balance ring mounted in a corresponding slot under the rim of the blisk. The balance correction may also be a locally machined area for removing mass at the airfoil tips or in the platform between airfoils (not shown) for dynamically balancing the entire blisk.

As shown in FIGS. 3 and 4, the forward shaft 52 is preferably conical and decreases in diameter forwardly from the forwardmost second stage disk 44 to the bearing seat 54 at the forwardmost end of the shaft. Correspondingly, the blisk arm 60 is preferably conical and decreases in diameter forwardly from the blisk hub 56 to the alignment rabbet 62.

The conical forward shaft 52 and blisk arm 60 provide enhanced structural rigidity in three dimensions and also permit unobstructed assembly and disassembly of the blisk around the forward shaft. As indicated above the center bore of the blisk hub 56 illustrated in FIG. 3 is preferably conical to match the conical configuration of the inboard shaft 52, with the bore having a minimum inner diameter B which is slightly larger than the outer diameter A of the alignment lug 64 for permitting unobstructed axial movement of the blisk over the lug 64 during assembly and disassembly.

Since the compressor rotor 26 illustrated in FIG. 3 is powered during operation by the HPT, the blisk 50 must be suitably joined to the forward shaft 52 for carrying torque thereto. Accordingly, means are provided for fixedly joining the blisk arm 60 to the forward shaft 52 to engage the rabbet 62 and lug 64 in alignment, and for carrying torque between the rotor and blisk.

In the preferred embodiment illustrated in FIGS. 3–5, the blisk joining means include a plurality of circumferentially spaced apart splines 68 formed in the outer surface of the forward shaft 52 in a cylindrical portion thereof disposed forwardly of the lug 64. A plurality of circumferentially spaced apart spline grooves 70 are formed inside a cylindrical portion of the blisk arm 60 forwardly of the rabbet 62 for circumferentially engaging the complementary splines 68 for transmitting torque during operation.

A retention nut 72 threadingly engages external threads on the forward shaft forwardly of the splines in axial abutment with the forward distal end of the blisk arm 60 to axially retain the axial face of the rabbet 62 against the complementary axial face of the lug 64.

As initially shown in FIG. 3, the compressor stator casing 40 surrounds the compressor rotor 26, including the several disks 44 thereof and piggyback blisk 50, with the stator vanes 42 disposed axially therebetween. The fan module 16 is preferably removably joined to the forward end of the compressor casing 40 at a conventional flange joint 74 having mating radial flanges and fastening bolts and nuts. By disassembling the flange joint 74, and conventionally uncoupling the fan and compressor rotors, the entire fan module 16 may be removed from the front of the engine for permitting direct and front access to the blisk 50 for removal thereof from the exposed forward shaft 52.

Figure 6:
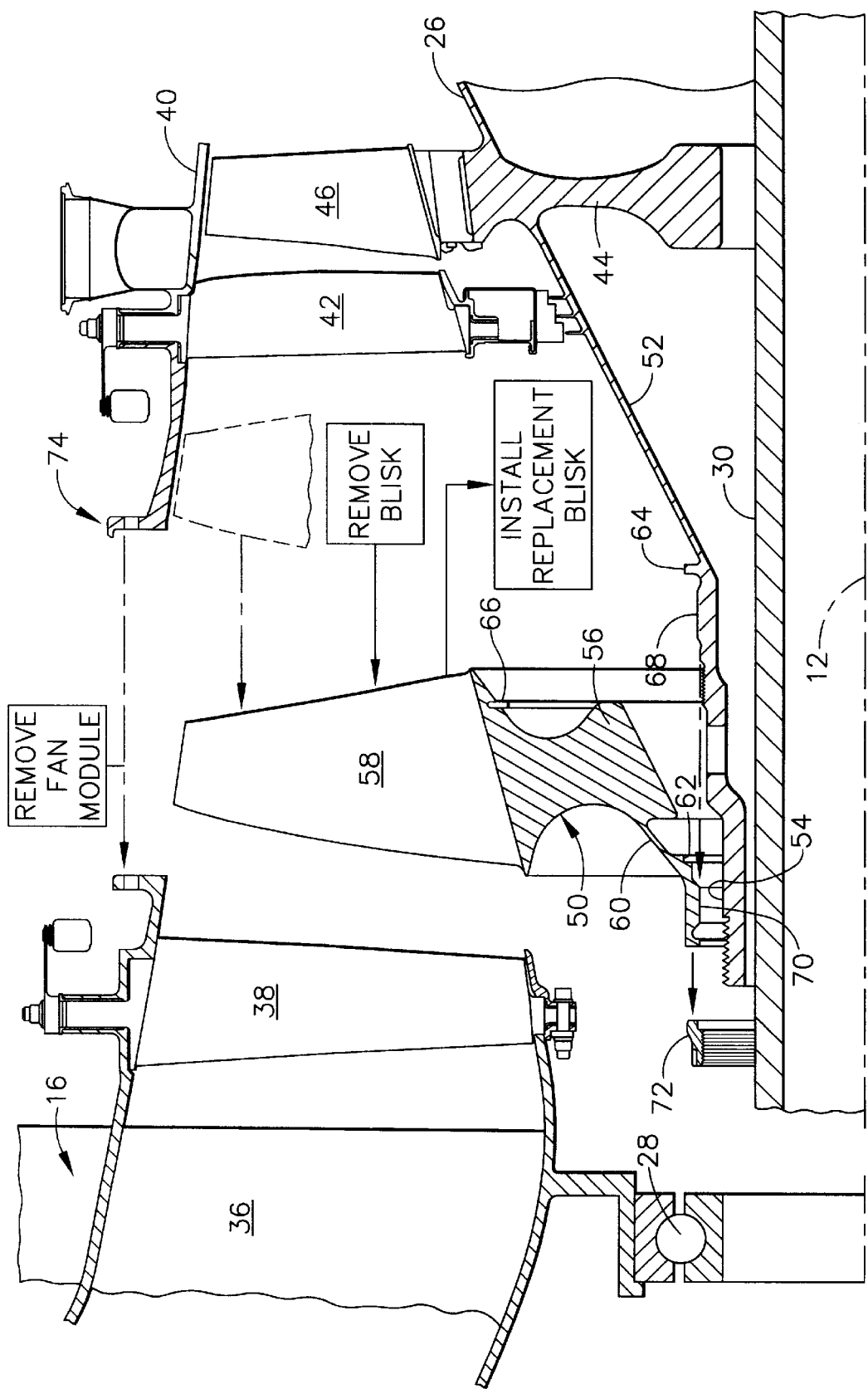
FIG. 6 is an exploded view of the forward portion of the compressor rotor illustrated in FIG. 3, and a flowchart of a method of repair thereof.

Removal of the fan module 16 is illustrated in FIG. 6. The inlet guide vanes 38 which directly precede the blisk 50 remain attached to the aft end of the fan module near the corresponding portion of the disassembled flange joint 74. The third bearing 28 remains attached to the front frame 36 of the fan module.

Accordingly, when the fan module is removed from the front of the high pressure compressor, the third bearing 28 is removable with the fan module for providing direct access to the blisk 50 for removal thereof. The fan shaft 30 which joins the fan to the low pressure compressor may be disconnected in any conventional manner for permitting the entire fan module to be removed from the compressor casing 40.

The exposed blisk 50 may then be removed from the forward shaft 52 and replaced by installing a replacement blisk around the forward shaft in its place. The fan module 16 may then be re-installed in the reverse manner in which it was removed.

As shown in FIG. 6, the blisk 50 itself is removed from the forward shaft 52 by first removing the retention nut 72 from the shaft 52, which then permits the blisk 50 to be simply removed axially forwardly from the alignment lug 64 as the spline grooves 70 are withdrawn from the inboard splines 68. The replacement blisk is installed in an opposite sequence in which the splines 68 and grooves 70 engage as the rabbet 62 is seated around the alignment lug 64. The nut 72 is then re-installed on the forward shaft 52 to secure the blisk thereon.

Since the compressor rotor 26 is not disassembled for removing and replacing the blisk 50, its concentricity and balance are maintained without change. When the fan module is re-installed, the third bearing 28 receives the bearing seat 54 of the forward shaft 52 returning the compressor rotor to its original alignment in the bearing.

Figure 7:
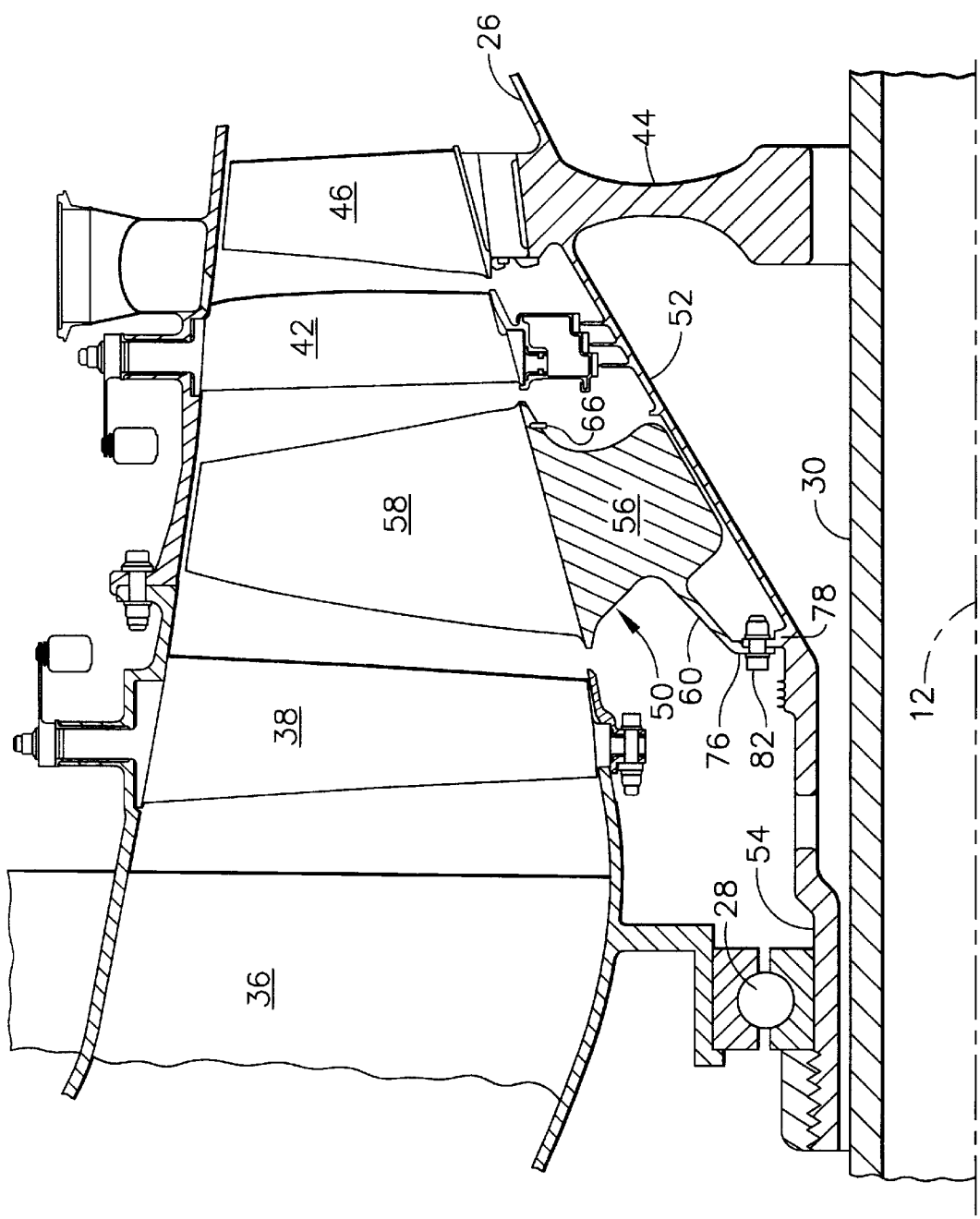
FIG. 7 is an axial sectional view of the forward portion of the high pressure compressor rotor illustrated in FIG. 1 having a piggyback blisk in accordance with another embodiment of the present invention.
Figure 8:
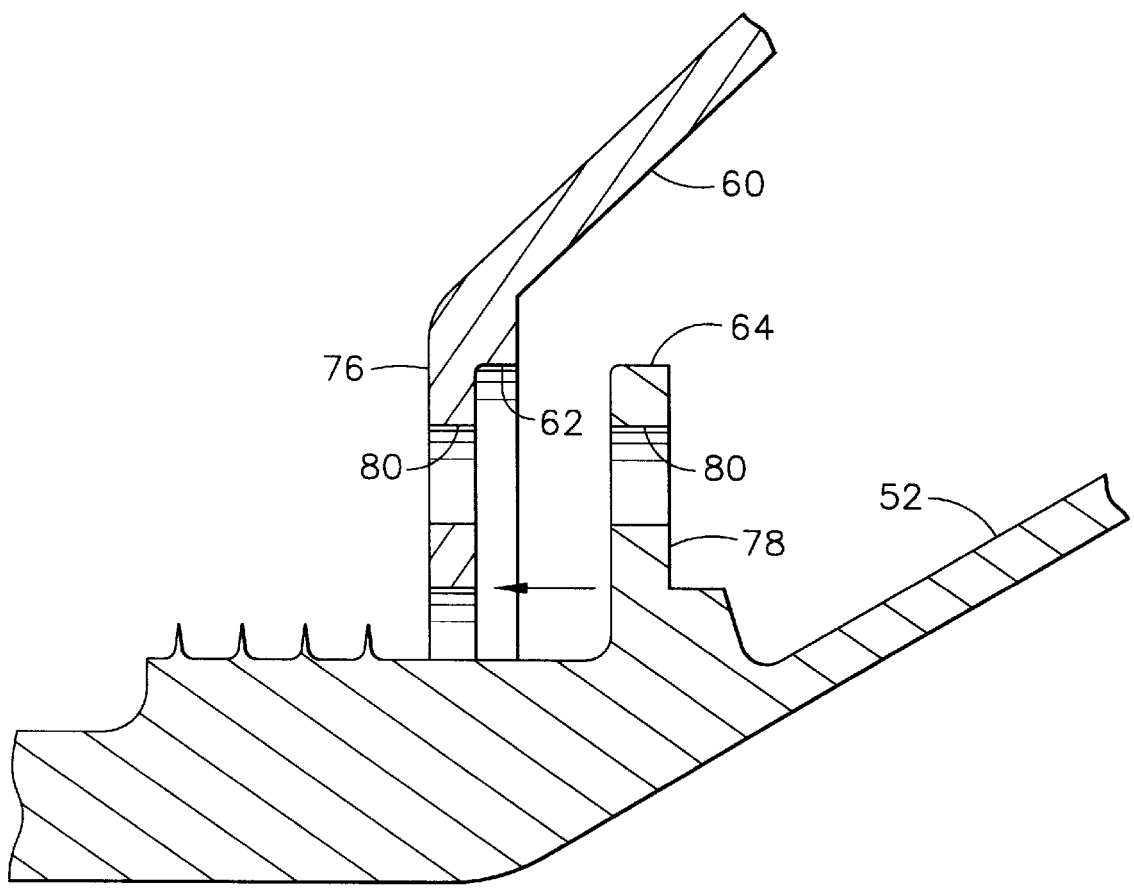
FIG. 8 is an enlarged and exploded axial sectional view through the blisk arm and rotor shaft illustrated in FIG. 7.

FIGS. 7 and 8 illustrate an alternate embodiment of mounting the blisk 50 to the forward shaft 52. In this embodiment, the joining means include a radially inwardly extending outer flange 76 disposed at the distal forward end of the blisk arm 60 in which the rabbet 62 is formed.

The alignment lug is in the form of a radially outwardly extending inner flange 78 integrally formed with the shaft 52. A plurality of circumferentially spaced apart axial bolt holes 80 extend through the outer and inner flanges 76, 78 for receiving a corresponding plurality of fasteners 82 in the form of bolts which are retained by corresponding nuts for clamping the blisk arm 60 to the forward shaft 52. The mating faces of the two flanges 76, 78 provide a friction interface for transmitting torque during operation while the rabbet 62 and lug 64 maintain precise concentricity of the blisk around the centerline axis 12.

The two embodiments illustrated in FIGS. 3 and 7 are generally similar except for the specific embodiment of the means for joining the blisks to the forward shaft for carrying torque therebetween while permitting disassembly thereof for repair. The forward shaft remains continuous between the second stage disk 44 and the forward bearing seat 54, and is not interrupted by the removable blisk 50.

The spline embodiment illustrated in FIG. 3 is preferred since the outer diameter A of the lug 64 may be minimized within the available space for correspondingly minimizing the inner diameter B of the blisk hub 56.

Since the lug 64 in the embodiment illustrated in FIGS. 7 and 8 is integrated with the inner flange 78, it requires a correspondingly larger outer diameter for permitting sufficient strength in the flange joint for carrying torque therethrough. Correspondingly, the inner diameter of the blisk hub 56 in FIG. 7 would be larger than that for the FIG. 3 embodiment.

By making the inner diameter of the blisk hub 56 as small as possible, the corresponding strength of the hub is increased. Increased hub strength permits the blisk hub to be made smaller in size for acceptable limits of stress during operation, with a corresponding reduction in weight thereof. The introduction of the blisk 50 in the first instance is for its enhanced aerodynamic performance and mechanical strength, and the corresponding weight reduction attributable thereto. The spline mounting of the blisk in FIG. 3 further minimizes the size of the blisk hub for additionally reducing overall weight as compared with the FIG. 7 embodiment.

In the several configurations disclosed above, the blisk 50 defines the first and largest stage of the high pressure compressor and permits a substantial weight reduction of the engine, especially for large commercial turbofan engines. The piggyback mounting of the blisk to the independent compressor rotor 26 permits convenient removal of the blisk alone without requiring complete teardown of the engine and high pressure compressor 18. In this way, the structural integrity of the high pressure compressor rotor 26 is maintained, and the elaborate process of teardown and re-assembly thereof is not required in a maintenance operation.

If desired, more than one stage of the high pressure compressor may be formed using blisks instead of bladed disks and mounted piggyback to the forward end of the compressor rotor for permitting independent removal of the blisks without teardown of the compressor rotor.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A compressor rotor comprising:
   a plurality of coaxially adjoining disks each having a row of rotor blades extending radially outwardly therefrom;
   a forward shaft affixed to a forward one of said disks, and having an annular seat at a forward end thereof for being mounted in a bearing to support said rotor at a forward end thereof; and
   a blisk coaxially surrounding said forward shaft axially between said seat and forward disk, and removably fixedly joined piggyback to said forward shaft.

2. A rotor according to claim 1 wherein:
   said blisk includes a hub surrounding said forward shaft, an annular supporting arm extending integrally from said hub, and an annular rabbet facing radially inwardly from said arm; and
   said forward shaft includes an annular lug being complementary with said rabbet for coaxially aligning said blisk on said forward shaft.

3. A rotor according to claim 2 further comprising means for fixedly joining said blisk arm to said forward shaft to engage said rabbet and lug.

4. A rotor according to claim 3 wherein:
   said forward shaft is conical and decreases in diameter forwardly from said forward disk to said bearing seat; and
   said blisk arm is conical and decreases in diameter forwardly from said hub to said rabbet.

5. A rotor according to claim 4 wherein said blisk hub includes a center bore having a diameter greater than said lug.

6. A rotor according to claim 5 wherein said joining means comprise:
   a plurality of circumferentially spaced apart splines on said forward shaft disposed forwardly of said lug;
   a plurality of circumferentially spaced apart grooves formed inside said blisk arm forwardly of said rabbet for engaging said splines; and
   a retention nut threadingly engaging said forward shaft forwardly of said splines in abutment with said blisk arm to axially retain said rabbet against said lug.

7. A rotor according to claim 5 wherein said joining means comprise:
   a radial flange at a distal end of said blisk arm having said rabbet therein;
   a plurality of circumferentially spaced apart holes extending through said flange and lug; and
   a plurality of fasteners extending through respective holes for retaining said flange on said lug.

8. A rotor according to claim 5 wherein said blisk further includes a balance correction independent of said disks and forward shaft.

9. A rotor according to claim 5 further comprising:
   a plurality of flange joints axially joining together said disks in a collective assembly of rotor components with said forward shaft, and said rotor components are stacked together to minimize eccentricity thereof from a centerline axis of said rotor; and
   said rabbet and lug are disposed coaxially with said centerline axis to independently minimize eccentricity of said blisk from said axis.

10. A rotor according to claim 5 in combination with:
    a compressor stator casing surrounding said disks and blisk; and
    a fan module removably joined to said casing for permitting access to said blisk for removal from said forward shaft.

11. An apparatus according to claim 10 wherein said fan module includes a front frame supporting said bearing, and said bearing is removable with said fan module for providing access to said blisk for removal thereof.

12. A method of repairing said rotor according to claim 5 comprising:

removing said blisk from said shaft without disassembly of said shaft and disks; and installing a replacement blisk on said shaft.

13. A method of repairing said rotor according to claim 6 comprising:

removing said nut from said shaft;

removing said blisk from said shaft;

installing a replacement blisk on said shaft; and re-installing said nut on said shaft to secure said blisk thereon.

14. A method of repairing said rotor according to claim 10 comprising:

removing said fan module from said casing;

removing said blisk from said shaft;

installing a replacement disk on said shaft; and re-installing said fan module to said casing.

15. An apparatus comprising:

a high pressure compressor including a casing and rotor disposed therein;

a fan module removably joined to said casing; and said compressor rotor includes:

a plurality of coaxially adjoining disks each having a row of rotor blades extending radially outwardly therefrom;

a forward shaft affixed to a forward one of said disks, and having an annular seat at a forward end thereof mounted in a bearing to support said rotor at a forward end thereof; and a blisk coaxially surrounding said forward shaft axially between said seat and forward disk, and removably fixedly joined piggyback to said forward shaft.

16. An apparatus according to claim 15 wherein said fan module includes a front frame supporting said bearing, and said bearing is removable with said fan module for providing access to said blisk for removal thereof.

17. An apparatus according to claim 16 wherein:

said blisk includes a hub surrounding said forward shaft, an annular supporting arm extending integrally forwardly from said hub, and an annular rabbet facing radially inwardly and aft from said arm; and said forward shaft includes an annular lug being complementary with said rabbet for coaxially aligning said blisk on said forward shaft.

18. An apparatus according to claim 17 further comprising means for fixedly joining said blisk arm to said forward shaft to engage said rabbet and lug.

19. An apparatus according to claim 18 wherein:

said forward shaft is conical and decreases in diameter forwardly from said forward disk to said bearing seat; and said blisk arm is conical and decreases in diameter forwardly from said hub to said rabbet.

20. An apparatus according to claim 19 wherein said joining means comprise:

a plurality of circumferentially spaced apart splines on said forward shaft disposed forwardly of said lug;

a plurality of circumferentially spaced apart grooves formed inside said blisk arm forwardly of said rabbet for engaging said splines; and a retention nut threadingly engaging said forward shaft forwardly of said splines in abutment with said blisk arm to axially retain said rabbet against said lug.

21. A compressor rotor comprising a plurality of axially adjoining bladed disks, a shaft extending therefrom, and a blisk piggyback mounted around said shaft.

\* \* \* \* \*